United States Patent [19]

Bushnell

[11] Patent Number: 5,755,540
[45] Date of Patent: May 26, 1998

[54] VEHICLE TRANSPORTER

[75] Inventor: Raymond B. Bushnell, Oregon City, Oreg.

[73] Assignee: Boydtun Metal Works Inc., Portland, Oreg.

[21] Appl. No.: 651,970

[22] Filed: May 21, 1996

[51] Int. Cl.$^6$ ................................................. B60P 3/08
[52] U.S. Cl. ........................................ 410/29.1; 410/26
[58] Field of Search ......................... 410/4, 24, 24.1, 410/26, 29.1

[56] References Cited

U.S. PATENT DOCUMENTS

| | | |
|---|---|---|
| 2,492,829 | 12/1949 | Baker . |
| 2,917,277 | 12/1959 | Pine . |
| 2,967,512 | 1/1961 | Bom . |
| 3,251,278 | 5/1966 | Royster . |
| 3,650,416 | 3/1972 | Bodenheimer ............... 410/29.1 X |
| 3,880,457 | 4/1975 | Jones, Jr. ........................ 410/29.1 |
| 3,931,895 | 1/1976 | Grimaldo . |
| 4,078,779 | 3/1978 | Mölders . |
| 4,668,141 | 5/1987 | Petersen ............................. 410/12 |
| 4,668,142 | 5/1987 | Fity et al. ........................... 410/26 |
| 4,789,281 | 12/1988 | Westerdale ..................... 410/29.1 |
| 4,913,475 | 4/1990 | Bushnell et al. . |
| 5,020,960 | 6/1991 | Provenson ....................... 410/26 X |
| 5,071,298 | 12/1991 | Conzett ............................. 410/27 |
| 5,177,988 | 1/1993 | Bushnell . |
| 5,286,149 | 2/1994 | Seay et al. ........................ 410/26 |
| 5,332,345 | 7/1994 | Lillard ............................ 410/29.1 |

FOREIGN PATENT DOCUMENTS 1006496  10/1965  United Kingdom .
2050304  1/1981  United Kingdom .

OTHER PUBLICATIONS

Boydstun Metal Works Inc., "The Boydstun 9101 Stack Trailer . . . " (1992).

Boydstun Metal Works Inc., "Winter Package Option . . . " (1993).

*Primary Examiner*—Stephen T. Gordon
*Attorney, Agent, or Firm*—Chernoff, Vilhauer, McClung & Stenzel

[57] ABSTRACT

A vehicle transporter has an elongate vehicular frame with vehicle support members movable between different elevations relative to the frame. Respective telescopically-movable fluid power cylinder assemblies interconnect respective ones of the vehicle support members with the frame to selectively raise and lower the vehicle support members by telescopic movement of the cylinder assemblies. Each cylinder assembly has one or more respective locking members for preventing telescopic movement of the cylinder assembly in a lowering direction, to enable the cylinder assembly to support a respective vehicle support member independently of any fluid in the cylinder assembly. A remote control system is connected to each of the locking members to control its locked and unlocked positions. The locking members are movably mounted on a respective cylinder of each cylinder assembly.

13 Claims, 4 Drawing Sheets

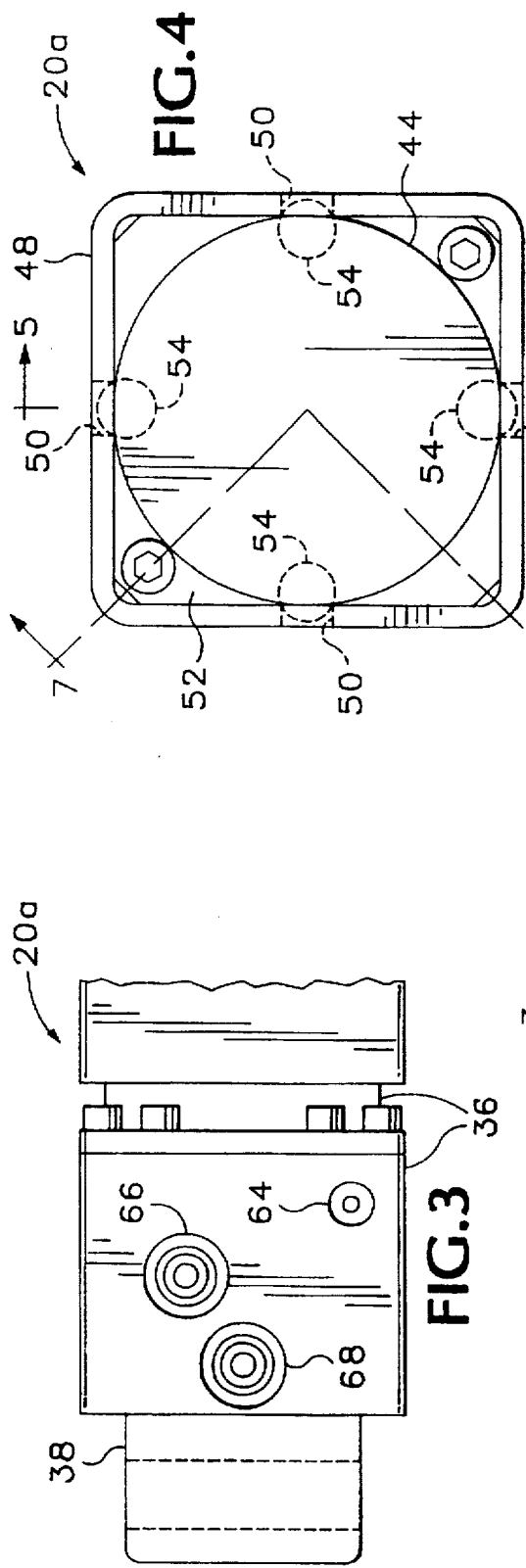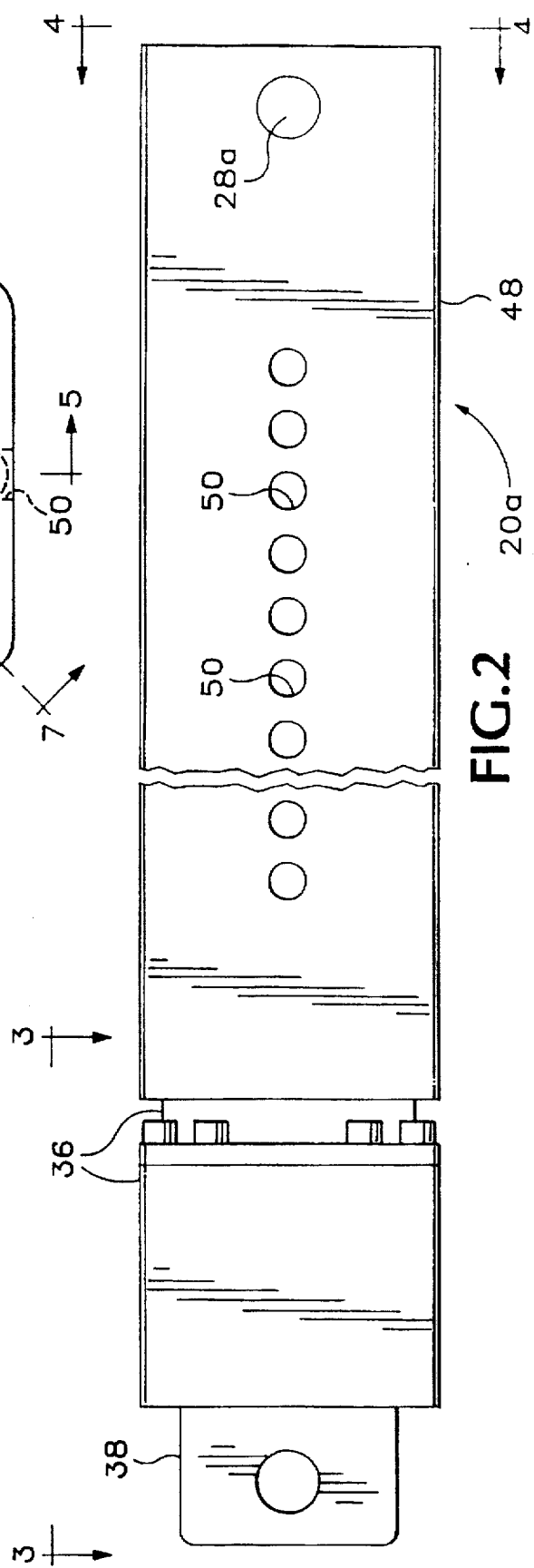

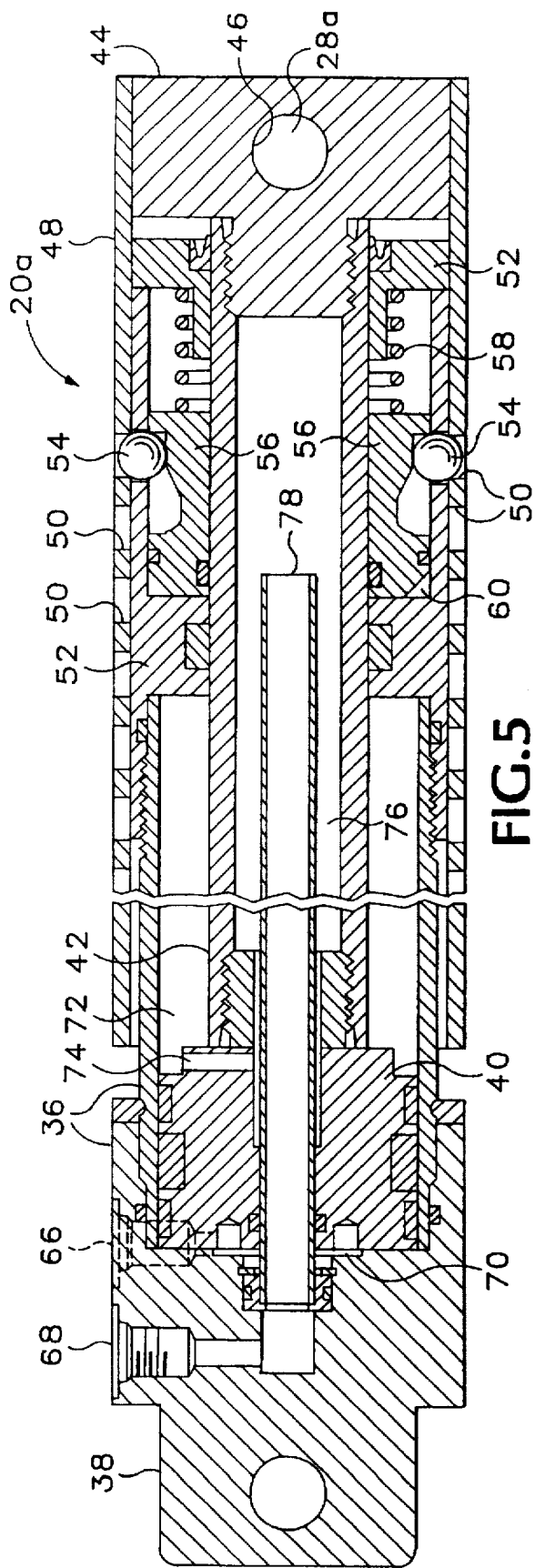
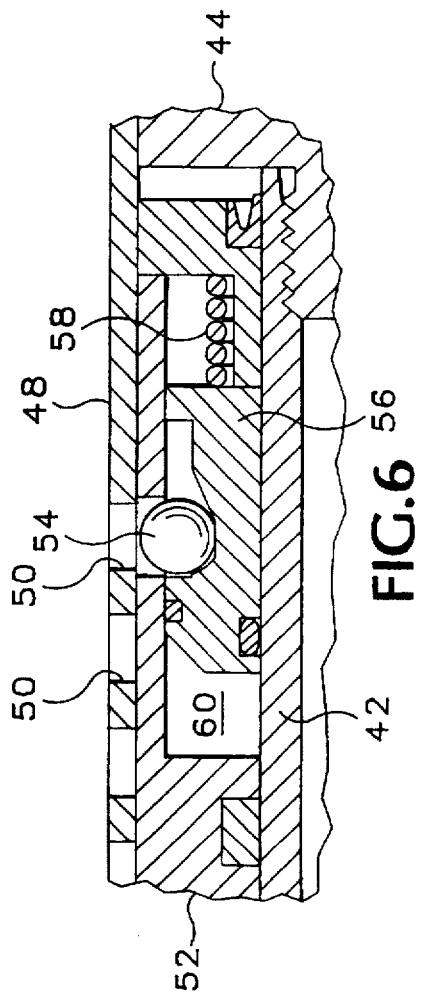
FIG.5
FIG.6

VEHICLE TRANSPORTER

BACKGROUND OF THE INVENTION

The present invention relates to vehicle transporters, such as trucks, trailers, railcars and the like, which have vehicle support members movable between different elevations on the transporter.

Conventional vehicle transporters are normally equipped with vehicle support members movable between different elevations by means of fluid power cylinder assemblies. Vehicle transporters of this type, such as truck/trailer combinations, are capable of elevating and orienting numerous automobiles in tightly stacked configurations to maximize the payload. However, a significant drawback of such transporters is the time required to lock each vehicle support member in its elevated position during loading of the transporter, and to unlock each support member during unloading. These tasks normally require the manual insertion of individual locking pins into the transporter's structural members after the vehicle support members have been raised to their desired elevated positions during loading of the transporter, and manual removal of such pins prior to lowering the vehicle support members during unloading. The use of such locking pins is important because they maintain the vehicle support members in their elevated positions regardless of whether or not the fluid power cylinder assemblies continue to support the vehicle support members. Thus, the locking pins prevent inadvertent lowering of the support members even if the fluid power cylinders experience broken fluid supply lines, leakage, inadvertent actuation of a lowering control valve, or other failures.

In addition to the excessive time required to insert and remove the manual locking pins, a further drawback to their use is the possibility that a fluid cylinder may fail while the associated vehicle support member is elevated, either before a locking pin has been installed during the loading process, or after a locking pin has been removed during the unloading process. In such case, workmen in close proximity to the elevated vehicles during the loading and unloading processes are especially susceptible to injury.

I am informed by the assignee of the present invention that at least one prior vehicle transporter in public use in this country approximately 20 years ago utilized remotely-controlled, pneumatically-actuated locking lugs which, together with their pneumatic actuators, moved up and down vertically in unison with a vehicle support member under the control of hydraulic cylinder assemblies until the desired elevation was obtained. At that point, pneumatic pressure was released in unison from transverse pairs of the actuators, and springs moved the corresponding pairs of lugs into locked positions relative to cooperating structural members. Unlocking was accomplished remotely by the application of pneumatic pressure to the actuators. Although such a system eliminated the need for manual locking pins, it created other significant problems. The need for vertically-movable pneumatic actuators required corresponding vertically-movable pneumatic conduits, which were readily exposed to wear and damage and difficult to route within the vehicle support structure. Moreover, the pneumatic actuators were highly susceptible to rapid wear from environmental influences due to their exposed locations separate from the hydraulic cylinder assemblies. Such problems would have been amplified unacceptably in today's modern vehicle transporters, which include significantly more movable elements requiring locking. In addition, the lack of separate control of the transverse pairs of actuators made it difficult to level the vehicle support members transversely.

SUMMARY OF THE INVENTION

The present invention overcomes the foregoing drawbacks of previous vehicle transporters by providing fluid power cylinder assemblies and respective locking members each associated with a respective cylinder assembly and capable, when in a locked position, of preventing the lowering of a vehicle support member independently of any fluid in the respective cylinder assembly, together with a remote control system connected to each of the locking members which eliminates the need for a control conduit which must move in unison with the extension and retraction of the fluid power cylinder assembly.

In accordance with a separate aspect of the invention, each of the locking members is movably mounted on a respective cylinder of a cylinder assembly for movement between its locked and unlocked positions.

The provision of a remote control system connected to each of the locking members enables the operator to lock the vehicle support members rapidly in place immediately after they have been raised to their elevated positions while the operator remains safely at a central control station, and conversely to unlock the support members rapidly immediately before lowering them to unload the vehicles. This not only saves significant time during the loading and unloading processes by eliminating the need for manual individual pin insertion and removal, but also maximizes safety by minimizing the time span during which the elevated vehicle support members are unlocked and eliminating the need for close proximity of a workman during the locking and unlocking procedures. The elimination of lock control conduits movable in unison with the extension and retraction of the fluid power cylinders minimizes conduit wear, damage and routing problems.

The mounting of the locking members on the respective cylinders themselves significantly simplifies the structure of the vehicle transporter by eliminating the need for separate lockable structural members to maintain the vehicle support members in their elevated positions, while enabling the cylinder assemblies to protect the lock actuators from environmental influences and resultant rapid wear.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 2 is an extended side view of an exemplary fluid power cylinder assembly utilized in the embodiment of FIG. 1.

FIG. 3 is a partial side view taken along line 3—3 of FIG. 2.

FIG. 4 is an end view taken along line 4—4 of FIG. 2.

FIG. 5 is a sectional view taken along line 5—5 of FIG. 4, showing locking members in their locked positions.

FIG. 6 is an enlarged sectional detail view of a locking member in its unlocked position.

DESCRIPTION OF THE PREFERRED EMBODIMENT

Figure 1:
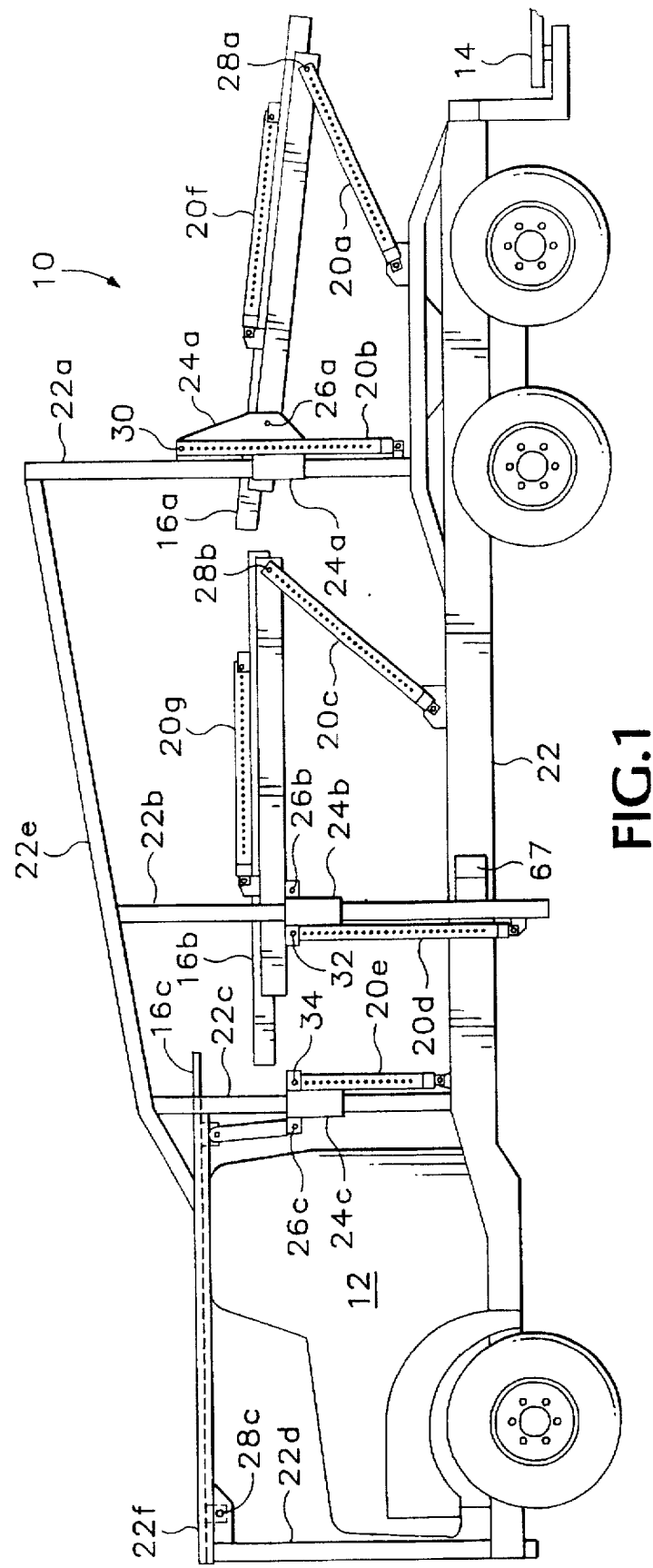
FIG. 1 is a simplified side view of an exemplary embodiment of a vehicle transporter in accordance with the present invention, with certain elements deleted for clarity.

An exemplary vehicle transporter incorporating the present invention, indicated generally as 10 in the simplified side view of FIG. 1, comprises an automobile-carrying truck unit 12 and an automobile-carrying trailer 14 (only the articulated hitch of the trailer being shown). Both the truck and trailer have comparable vehicle-support members such as 16a, 16b and 16c, and comparable telescopically extensible and retractable fluid power cylinder assemblies such as 20a, 20b, 20c, 20d, 20e, 20f, and 20g for selectively moving the vehicle support members to different adjustable positions at different elevations. The truck unit 12 is preferably capable of transporting four or five vehicles depending upon their sizes, and the trailer 14 is preferably equipped with a larger number of vehicle support members capable of transporting a larger number of vehicles.

The present invention can also be incorporated into many alternative configurations of vehicle transporters, having diverse other arrangements of vehicle support members as shown, for example, in U.S. Pat. Nos. 2,492,829, 3,650,416, 3,931,895, 4,668,141, 4,668,142, 4,789,281, 5,071,298, and 5,286,149, all of which are incorporated herein by reference. Any alternative configuration capable of being modified advantageously to incorporate the principles of the present invention, as so modified, is intended to be within the scope of the present invention.

Returning to the exemplary embodiment of FIG. 1, the vehicle transporter 10 includes an elongate vehicular frame 22 having upright posts 22a, 22b, 22c, 22d interconnected at their tops by upper rails 22e, 22f. The respective vehicle support members 16a, 16b and 16c, which preferably are longitudinal wheel-supporting ramps, are pivotally mounted on the respective posts 22a, 22b and 22c by means of their connections through pivot pins 26a, 26b and 26c with respective sleeve assemblies 24a, 24b and 24c. The sleeve assemblies slide up and down the respective posts in response to the extension or retraction of the cylinder assemblies 20b, 20d and 20e which are connected to the sleeves by respective pins 30, 32, 34. The opposite ends of the vehicle support members are pivotally interconnected with the frame 22 by pivot pins 28a, 28b and 28c, respectively, the pins 28a and 28b being movable relative to the frame 22 in response to the extension or retraction of the cylinder assemblies 20a and 20c. Thus the separate telescopic movement of a cylinder assembly 20a, 20b, 20c, 20d or 20e selectively raises and lowers the respective vehicle support member 16a, 16b, or 16c to which it is connected. By independently varying the elevations of the opposite ends of the respective vehicle support members, their tiltable attitudes relative to the horizontal are also varied.

Telescopic movements of fluid power cylinder assemblies 20f and 20g slide the vehicle support members 16a and 16b, respectively, longitudinally of the truck unit 12 which, when such vehicle support members are tilted, likewise raises or lowers them. Such longitudinal adjustment of the vehicle support members 16a and 16b is useful in order to longitudinally adjust the positions of the elevated vehicles. However, the present invention is also intended to encompass transporters having no such longitudinal adjustment feature.

It should be understood that the transporter of FIG. 1 has duplicates of each element just described arranged longitudinally along each side of the transporter transversely separated from each other, with the telescopic movement of each corresponding transverse pair of cylinder assemblies being controlled in unison.

FIGS. 2–7 depict the fluid power cylinder assembly 20a of FIG. 1, which is representative of the structure of all other cylinder assemblies employed in the transporter 10. The cylinder assembly 20a includes a cylinder 36 having an apertured lug 38 at its base for anchoring the cylinder to the frame 22, or other anchoring point, by means of a pin or bolt. Within the cylinder 36 are a selectively extensible and retractable piston 40 and piston rod 42 having a rod end 44, the extension or retraction of the piston and piston rod providing telescopic movement of the cylinder assembly 20a. The rod end 44 has a transverse aperture 46 through which passes the pin 28a which pivotally connects the rod end to the vehicle support member 16a.

Surrounding the cylinder 36 is a tubular locking plate 48 of square cross section affixed to the rod end 44 by the pin 28a, so as to extend or retract in unison with the piston rod 42. Along each of the four sides of the tubular locking plate 48 is a respective longitudinally-spaced array of locking apertures 50.

The top of the cylinder 36 includes a locking assembly 52 which slidably and matingly engages the interior of the tubular locking plate 48 and has a respective spherical locking member 54 on each of its four sides in longitudinal alignment with a respective one of the arrays of apertures 50 formed in the tubular locking plate 48. A sleeve-like cam 56 is longitudinally slidable within the locking assembly 52, and is spring-biased by a coil spring 58 to a position as shown in FIG. 5 forcing all four of the spherical locking members 54 radially outward relative to the cylinder 36 into locked positions within respective ones of the apertures 50 in the tubular locking plate 48. Such locked positions prevent the locking plate 48 and piston rod 42 from extending or retracting telescopically relative to the cylinder 36.

Figure 7:
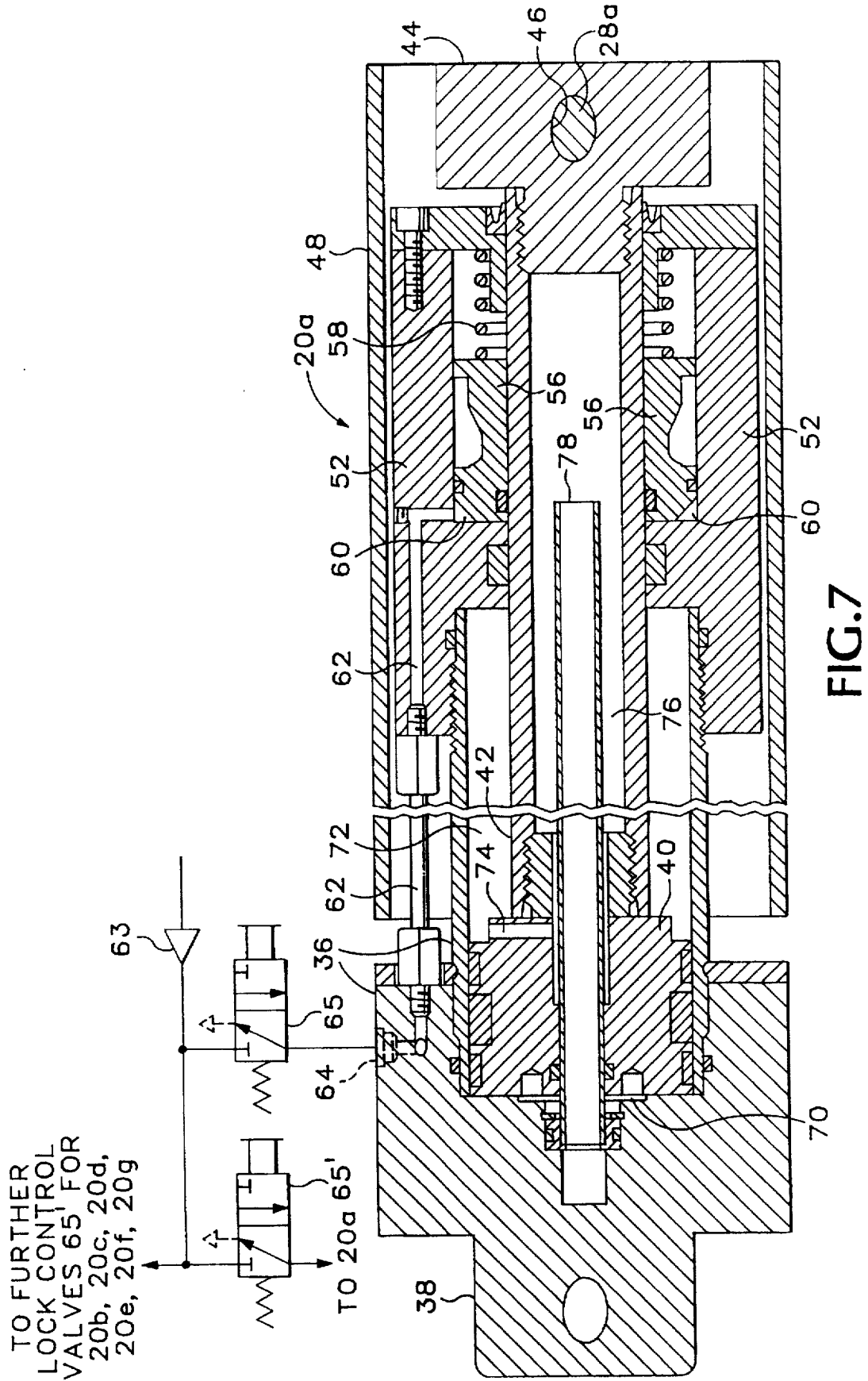
FIG. 7 is a sectional view taken along line 7—7 of FIG. 4, showing schematically the remote control system for controlling the locked and unlocked positions of the locking members.

With reference to FIGS. 6 and 7, the end of the cam 56 opposite to the coil spring 58 is exposed to an annular fluid chamber 60 into which pressurized air may be selectively admitted from a source 63, such as an accumulator, through a port 64 and conduit 62 fixed to the cylinder 36 by manually opening a valve 65 spring-biased to its closed position and located remotely from the locking assembly 52. Such pressurized air causes the cam 56 to compress the spring 58 to the position shown in FIG. 6, thereby enabling the spherical locking members 54 to retract radially into unlocked positions as shown in FIG. 6 which no longer protrude into the apertures 50 of the locking plate 48. Such unlocked positions free the tubular locking plate 48 and piston rod 42 to extend or retract telescopically relative to the cylinder 36. Exhaustion of the pressurized air from the chamber 60 through the port 64 by closure of the valve 65, as shown in FIG. 7, allows the coil spring 58 to return the cam 56 toward its locking position which causes the spherical locking members 54 to move outwardly into their locked positions when they are aligned with respective apertures 50 in the locking plate 48.

A separate valve 65' is connected to the port 64 of the corresponding cylinder assembly 20a located on the opposite side of the transporter 10 so as to control the locking assembly of the corresponding cylinder assembly separately. Other remote control valves such as 65' separately control the locking assemblies of other respective cylinder assemblies, such as 20b, 20c etc. All of the valves 65, 65' are preferably located together in a location remote from the locking assemblies and adjacent to the respective extension/retraction control valves for the cylinder assemblies. A remote location along the side of the transporter is suitable, such as in a compartment 67 (FIG. 1).

Telescopic movement of the cylinder assembly 20a, when the locking members 54 are in their unlocked positions, is accomplished by controlling the flow of pressurized hydraulic fluid to and from an extension port 66 and retraction port 68 formed in the base of the cylinder 36, by means of a conventional fluid control valve (not shown). Fluid admitted through the extension port 66 flows into a chamber 70 beneath the piston 40 forcing it to extend the piston rod 42. Meanwhile, fluid on the opposite side of the piston 40 in the annular chamber 72 is exhausted through radial ports such as 74 inwardly into a chamber 76 within the piston rod 42 and thence through a tube 78 out the exhaust port 68. Conversely, to retract the piston rod 42 pressurized fluid is admitted through port 68 and exhausted through port 66, with directions of flow opposite to those just described.

Although it is preferable that the cylinder assembly 20a be of a double-acting type, i.e. powered by pressurized fluid in both its extension and retraction modes, it could alternatively be single-acting so that it is powered by pressurized fluid only in its extension mode. Also, although it is preferable that the cylinder assembly 20a operate hydraulically and its locking assembly 52 operate pneumatically, either could operate with liquid or gaseous pressurized fluid. Moreover, alternative types of locking assemblies, such as those operated by solenoids, could be controlled by electrical conduits rather than fluid conduits.

During loading of the vehicle transporter 10, vehicles are driven onto the vehicle support members while the cylinder assemblies 20a, 20b, 20c, 20d and 20e are in their retracted conditions. The vehicles are secured to their respective vehicle support members by a tie-down system, and each transverse pair of corresponding cylinder assemblies is extended in unison by a separate control valve to raise a respective vehicle support member to its desired elevation and tilting attitude. While each pair of cylinder assemblies is being extended, pressurized fluid is fed by the appropriate valve 65, 65' to the respective locking assemblies 52 of the pair of cylinders into chambers 60 thereof to move the cams 56 against the compression of springs 58 and thereby enable the spherical locking members 54 to assume their unlocked positions as shown in FIG. 6. When the desired elevation of a vehicle support member has been reached, fluid is exhausted from the chambers 60 of the appropriate locking assemblies 52, enabling the cams 56 to push the locking members 54 toward their locked positions under the force of the springs 58. If the appropriate apertures 50 are not aligned with the locking members 54, the cylinder assemblies can be extended or retracted slightly until the locking members 54 align with the apertures 50 and snap into their locked positions under the force of the springs 58.

Conversely, during unloading operations, pressurized fluid is admitted into the appropriate chambers 60 of the locking assemblies 52 by the appropriate valve 65, 65' to enable the locking members 54 to move into their unlocked positions, immediately before the cylinder assemblies are retracted to lower the vehicle support members. Such fluid is then exhausted from the chambers 60 after the desired retraction has been accomplished. The vehicle tie-down system is released and the vehicles are driven off of the vehicle support members.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:
1. A vehicle transporter comprising:
(a) an elongate vehicular frame having at least one vehicle support member movable between different elevations relative to said frame;
(b) at least a pair of respective telescopically-movable fluid power cylinder assemblies, each having an elongate respective piston rod, interconnecting said vehicle support member with said frame so as to selectively raise and lower said vehicle support member relative to said frame by telescopic movement of said cylinder assemblies in respective opposite directions;
(c) respective locking members, each having a selectively controlled locked position and unlocked position, each associated with a different respective said cylinder assembly and capable, when in a locked position, of preventing lowering of said vehicle support member independently of any force exerted longitudinally along said elongate respective piston rod from within said respective cylinder assembly; and
(d) a remote control system located remotely from said locking members and connected to each respective said locking member so as to selectively actuate each said locking member either into said locked position or into said unlocked position, said remote control system being connected to each said respective locking member by a respective conduit having an end adjacent to said locking member, and said telescopic movement of the respective cylinder assembly associated with said respective locking member being substantially independent of any movement by said end of said conduit in said opposite directions of telescopic movement of said respective cylinder assembly.

2. The apparatus of claim 1 wherein said respective cylinder assembly includes a cylinder, said respective locking member being movably mounted on said cylinder for movement between said locked position and said unlocked position.

3. The apparatus of claim 1 wherein said remote control system comprises respective separately controllable remote actuators, each connected to a different said respective conduit.

4. The apparatus of claim 1 wherein each of said locking members is spring-biased to said locked position.

5. A vehicle transporter comprising:
(a) an elongate vehicular frame having at least one vehicle support member movable between different elevations relative to said frame;
(b) at least a pair of respective telescopically-movable fluid power cylinder assemblies interconnecting said vehicle support member with said frame so as to selectively raise and lower said vehicle support member relative to said frame by telescopic movement of said cylinder assemblies in respective opposite directions;
(c) respective locking members, each having a selectively controlled locked position and unlocked position, each associated with a respective said cylinder assembly and capable, when in a locked position, of preventing telescopic movement of said respective cylinder assembly in a direction which lowers said vehicle support member;
(d) each of said cylinder assemblies having an elongate respective cylinder and a respective selectively extensible and retractable piston rod connected to an elongate respective locking plate external of said respective cylinder so as to move said locking plate relative to said cylinder in unison with said piston rod, each respective said locking member being movably mounted on said respective cylinder so as to be selectively extensible transversely outward from said cylinder into a position transversely interconnecting said cylinder with said respective locking plate independently of said piston rod so as to achieve said locked position.

6. The apparatus of claim 5 wherein each of said locking members has an unlocking actuator also mounted on said respective cylinder.

7. The apparatus of claim 5 including a remote control system located remotely from said locking members and connected to said locking members to selectively place each of them either in said locked position or in said unlocked position.

8. The apparatus of claim 7 wherein said remote control system comprises respective separately controllable remote actuators, each connected to a different one of said locking members associated with a different one of said cylinder assemblies.

9. The apparatus of claim 5 wherein said locking plate comprises an elongate tubular member substantially surrounding said respective cylinder.

10. The apparatus of claim 5 wherein each of said locking members is spring-biased to said locked position.

11. A vehicle transporter comprising:
(a) an elongate vehicular frame having at least one vehicle support member movable between different elevations relative to said frame;
(b) at least a pair of telescopically-movable fluid power cylinder assemblies located in corresponding transversely-opposed positions on said frame interconnecting said vehicle support member with said frame so as to selectively raise and lower said vehicle support member relative to said frame by telescopic movement of said cylinder assemblies in respective opposite directions;
(c) respective locking members, each having a selectively controlled locked position and unlocked position, each associated with a different respective said cylinder assembly and capable, when in a locked position, of preventing telescopic movement of said respective cylinder assembly in a direction which lowers said vehicle support member; and
(d) a remote control system located remotely from said locking members and connected to each respective said locking member so as to selectively actuate each said locking member either into said locked position or into said unlocked position;
(e) said remote control system comprising respective separately controllable remote actuators, each connected to a different one of said locking members associated with a different one of said cylinder assemblies.

12. The apparatus of claim 11 wherein said respective cylinder assembly includes a cylinder, said respective locking member being movably mounted on said cylinder for movement between said locked position and said unlocked position.

13. The apparatus of claim 11 wherein each of said locking members is spring-biased to said locked position.

* * * * *

UNITED STATES PATENT AND TRADEMARK OFFICE
CERTIFICATE OF CORRECTION

PATENT NO. : 5,755,540
DATED : May 26, 1998
INVENTOR(S) : Raymond B. Bushnell

It is certified that error appears in the above-identified patent and that said Letters Patent is hereby corrected as shown below:

On the title page item [73], "Change "Boydtun" to --Boydstun--

Signed and Sealed this

Thirtieth Day of March, 1999

Q. TODD DICKINSON

*Attest:*

*Attesting Officer*     Acting Commissioner of Patents and Trademarks